(12) United States Patent
Yiu et al.

(10) Patent No.: US 10,779,351 B2
(45) Date of Patent: Sep. 15, 2020

(54) RADIO LINK FAILURE HANDLING IN HIGH-FREQUENCY BAND NETWORKS

(71) Applicant: Intel IP Corporation, Santa Clara, CA (US)

(72) Inventors: Candy Yiu, Portland, OR (US); Umesh Phuyal, Beaverton, OR (US); Ansab Ali, Chicago, IL (US); Mo-Han Fong, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 16/078,792

(22) PCT Filed: Jul. 8, 2016

(86) PCT No.: PCT/US2016/041610
§ 371 (c)(1),
(2) Date: Aug. 22, 2018

(87) PCT Pub. No.: WO2017/164908
PCT Pub. Date: Sep. 28, 2017

(65) Prior Publication Data
US 2019/0053315 A1    Feb. 14, 2019

Related U.S. Application Data

(60) Provisional application No. 62/312,307, filed on Mar. 23, 2016.

(51) Int. Cl.
| | |
|---|---|
| *H04W 16/14* | (2009.01) |
| *H04W 76/19* | (2018.01) |
| *H04L 1/18* | (2006.01) |
| *H04W 76/25* | (2018.01) |

(52) U.S. Cl.
CPC ............ *H04W 76/19* (2018.02); *H04L 1/188* (2013.01); *H04L 1/189* (2013.01); *H04W 76/25* (2018.02)

(58) Field of Classification Search
CPC ........ H04L 1/188; H04L 1/189; H04W 76/19; H04W 76/25
See application file for complete search history.

(56) References Cited

U.S. PATENT DOCUMENTS

| | | | |
|---|---|---|---|
| 6,757,245 B1 * | 6/2004 | Kuusinen .............. | H04W 28/18 370/230 |
| 2017/0078890 A1 * | 3/2017 | Zhu ....................... | H04W 16/14 |

OTHER PUBLICATIONS

International Patent Office—International Search Report and Written Opinion dated Nov. 17, 2016, from International Application No. PCT/US2016/041610, 16 pages.
3GPP, "Technical Specification Group Radio Access Network; Radio Link Control (RLC) protocol specification (Release 13)," 3GPP TS 25.322 V13.0.0 (Dec. 2015), 90 pages.

(Continued)

*Primary Examiner* — Phuc H Tran
(74) *Attorney, Agent, or Firm* — Eschweiler & Potashnik, LLC

(57) ABSTRACT

Embodiments described herein relate generally to a communication between a user equipment (UE) and an evolved nodeB (eNodeB) communicating over a 5G link. Data rate throughput may be increased when, after a 5G channel blockage occurs, the UE may wait a determined amount of time to discover if the channel has opened before initiating a radio link failure ("RLF") and RLF recovery procedure.

20 Claims, 6 Drawing Sheets

(56) References Cited

OTHER PUBLICATIONS

3GPP, "Technical Specification Group Radio Access Network; Evolved Universal Terrestrial Radio Access (E-UTRA); Radio Link Control (RLC) protocol specification (Release 13)," 3GPP TS 36.322 V13.0.0 (Dec. 2015), Ltd Advanced Pro, 44 pages.

3GPP, "Technical Specification Group Radio Access Network; Evolved Universal Terrestrial Radio Access (E-UTRA); Radio Resource Control (RRC); Protocol specification (Release 13)," 3GPP TS 36.331 V13.0.0 (Dec. 2015), Lte Advanced Pro, 507 pages.

* cited by examiner

RADIO LINK FAILURE HANDLING IN HIGH-FREQUENCY BAND NETWORKS

CROSS REFERENCE TO RELATED APPLICATIONS

This application is a national phase entry under 35 U.S.C. § 371 of International Application No. PCT/US2016/041610, filed Jul. 8, 2016, entitled "RADIO LINK FAILURE HANDLING IN HIGH-FREQUENCY BAND NETWORKS", which designates the United States of America, which claims priority under 35 U.S.C. § 119(e) to U.S. Provisional Patent Application No. 62/312,307 entitled "RLF Handling in 5G Networks" and filed Mar. 23, 2016, the entire disclosures of which are incorporated herein by reference.

FIELD

Embodiments of the present disclosure relate generally to the field of wireless communications, and more particularly, to computer devices operable to implement radio link failure (RLF) in high-frequency band networks such as 5G networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

In high-frequency band networks, such as 5G networks as defined by 3GPP, the number of devices using these networks is expected to rapidly multiply over the next few years. One reason for the expected popularity is that, due to the high bandwidth that comes with high-frequency bands, data rates supported by these devices will greatly increase. In some cases the data rate is expected to increase more than 10 times. Along with this increase in data rate, connected devices operating in high-frequency bands may be more susceptible to connection blockages due to buildings and other obstructions as the devices move around, which may interfere with a device data rate.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment of the disclosure are not necessarily to the same embodiment, and they may mean at least one. It should also be noted that references to an "example" are references to non-limiting examples, unless otherwise stated.

DETAILED DESCRIPTION

Figure 1:
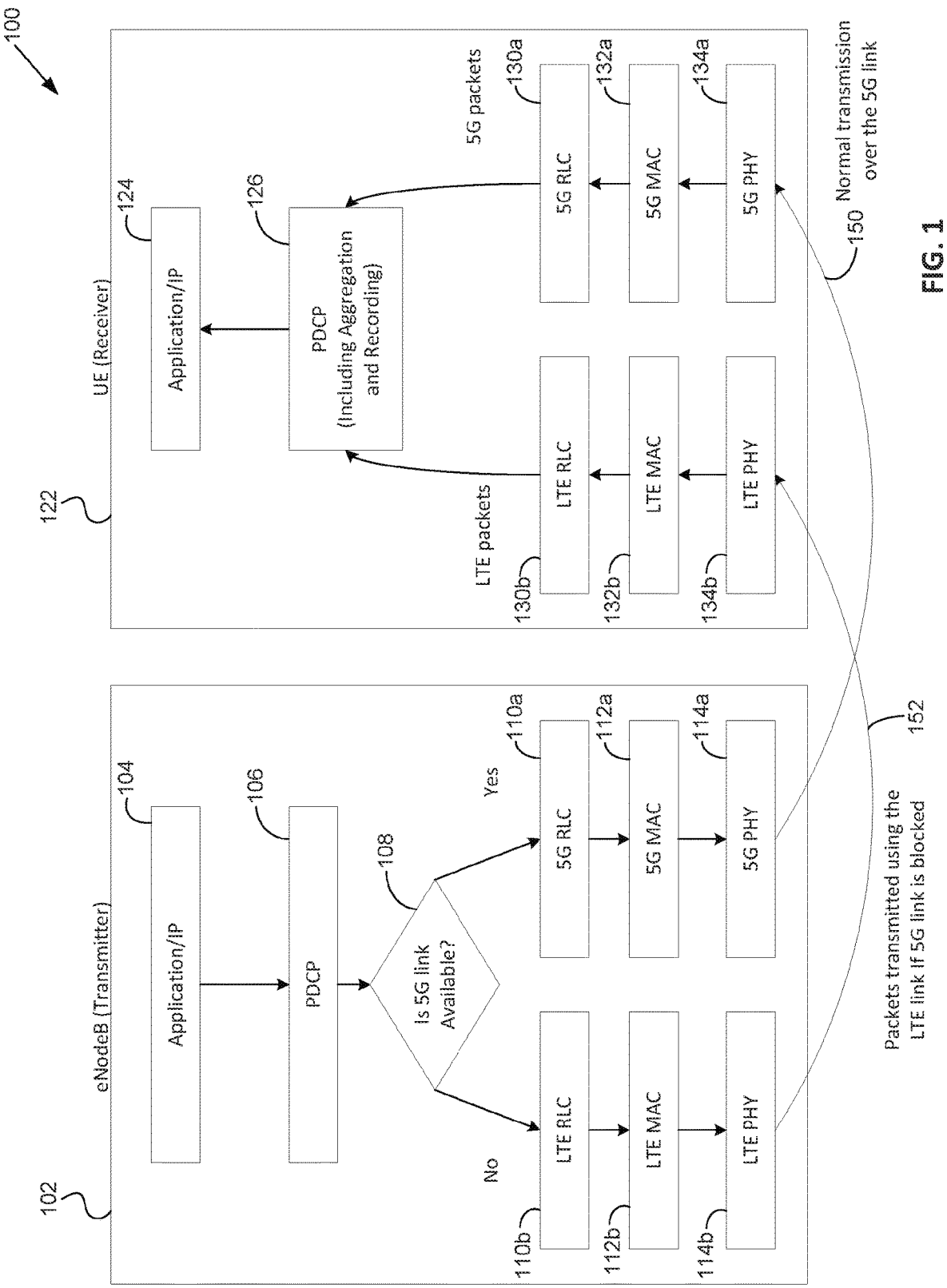
FIG. 1 illustrates a block diagram depicting data communication between an evolved NodeB (eNodeB) and a user equipment (UE) using both 5G and Long Term Evolution (LTE), in accordance with various embodiments.

In embodiments, some of the above-mentioned deficiencies of 5G networks may be overcome if, when a blockage occurs, the device, or user equipment ("UE"), instead of going into radio link failure ("RLF") mode and going through an RLF recovery procedure, instead stays in the radio resource control ("RRC") connected mode ("RRC_Connected") and waits for the channel blockage to end. Once blockage is over, the data transmission resumes on the 5G link again.

In embodiments, an evolved NodeB ("eNodeB") and a UE may be equipped with both conventional LTE as well as 5G links, each as separate/independent Radio Link Control ("RLC")/Medium Access Control ("MAC") entities for each of the links. Both of the links may be operational simultaneously in normal conditions except when a link, for example, a 5G link, may be unavailable due to poor radio conditions. In one example of data access, transferring a file using file transfer protocol ("FTP") may be initiated from an FTP server via an eNodeB to a UE using a high-frequency band 5G link as the primary means of communication. In embodiments, if a temporary channel blockage over the 5G link occurs, data transmission may then fall back on the slower but possibly more robust LTE link for the duration of the blockage without generating an RLF for the 5G link, until the blockage over the 5G link is cleared.

Throughout this disclosure, a 5G link is used as an example of a high-speed link that may be more susceptible to blockages, and an LTE link is used as an example of a lower-speed link that may be less susceptible to blockages. However, other links or other communication protocols may be used in other embodiments. For example, in some embodiments, a high-frequency link, e.g., a link operating in the millimeter wave (mmWave) band, may be an example of the higher-speed link, and a low-frequency link, for example, a link operating in a band less than 5 GHz, may be an example of a lower-speed link.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may be implemented in, or functions associated with the circuitry may be implemented by, one or more software or firmware programs.

FIG. 1 illustrates a block diagram depicting data communication between an eNodeB and UE, both using 5G and LTE links, in accordance with various embodiments. Diagram 100 shows an eNodeB 102 in data communication with a UE 122, where both are able to communicate using either an LTE protocol 152 or a 5G protocol 150. In embodiments, the eNodeB 102 may include an application 104 that may generate and/or receive data. In embodiments, the application 104 may be an Internet protocol ("IP")-based application that may run on the eNodeB 102 or may run on another device (not shown) that is in communication with the eNodeB 102, for example, over an Ethernet-based connection.

In embodiments, the application 104 may communicate data through a packet data convergence protocol (PDCP) 106. At connection assessment point 108, the eNodeB 102 may determine if a 5G link is available with the UE 122. If the 5G link is available, then the data may be transferred through the eNodeB 5G radio link control (RLC) layer 110a, the 5G media access control (MAC) layer 112a, and/or the 5G physical layer 114a and sent as packets over a 5G network to the UE 122. In embodiments, the packets may be received by the UE 5G physical layer 134a, then sent to the UE 5G MAC layer 132a, and then may be sent to the 5G RLC layer 130a. In embodiments, the packets may then be sent to the UE PDCP 126 for forwarding to the application 104.

If at the connection assessment point 108 the 5G link is not available, then the data may be routed through a secondary connection between the eNodeB 102 and the UE 122, such as an LTE protocol 152. This may be done without generating a radio link failure (RLF) with respect to the 5G link. In embodiments, the data may be transferred through the eNodeB LTE RLC layer 110b to the eNodeB LTE MAC layer 112b and/or the eNodeB LTE physical layer 114b and sent as packets over the LTE protocol 152 to the UE 122. In embodiments, the packets may be received by the UE LTE physical layer 134b, then sent to the UE LTE MAC layer 132b, and then may be sent to the LTE RLC layer 130b. In embodiments, the packets may then be sent to the UE PDCP 126 for forwarding to the application 124.

In embodiments, the availability of a 5G link may be based upon a blockage of the 5G channel, and the duration of the blockage. A blockage may be due to an obstruction between the UE 122 and the eNodeB 102 while the UE 122 is mobile, for example, a mobile phone in a moving vehicle where the path of the moving vehicle temporarily places a large building between the mobile phone and the eNodeB servicing it. In legacy implementations, such a blockage may cause the UE 122 to go into radio link failure (RLF) when the number of RLC retransmissions exceed the value of the number of retransmissions threshold. In embodiments, 5G link blockages that occur for a relatively short amount of time, for example, less than 10 milliseconds ("ms"), may see increased data rates by not going into RLF, and instead waiting for the RLC retransmissions to recover packets lost during the blockage.

In legacy implementations, during blocking conditions, when the RLC retransmission counter exceeds the maximum retransmission threshold, the RLC indicates to upper protocol layers that a maximum number of retransmissions has been reached, and an RLF is declared and RLF recovery procedures invoked.

In 5G implementations, data rates may be significantly higher and the bandwidth more fragile than LTE. For example, a UE operating in 5G, such as a cell phone in a moving car, may declare a radio link failure too soon when it is possible that the 5G link will recover very quickly as the UE moves past the obstruction causing the signal blockage. There may be significant degradation in file transfer performance in high-bandwidth data communication, when the high-bandwidth data communication link is subjected to lengthy RLF recovery procedures that may not be needed.

In embodiments, the eNodeB may detect the link blockage based on missing RLC status report (or performing polling on the status report) or through other means. Alternatively the UE may detect a blockage in a 5G link and send a blockage indicator to the LTE eNodeB. The LTE eNodeB can forward the indicator to the 4G/5G eNodeB and keep the RRC link open without immediately declaring an RLF. The link blockage may recover after some time. If it does not, a process may be implemented for declaring RLF and link recovery.

Figure 2:
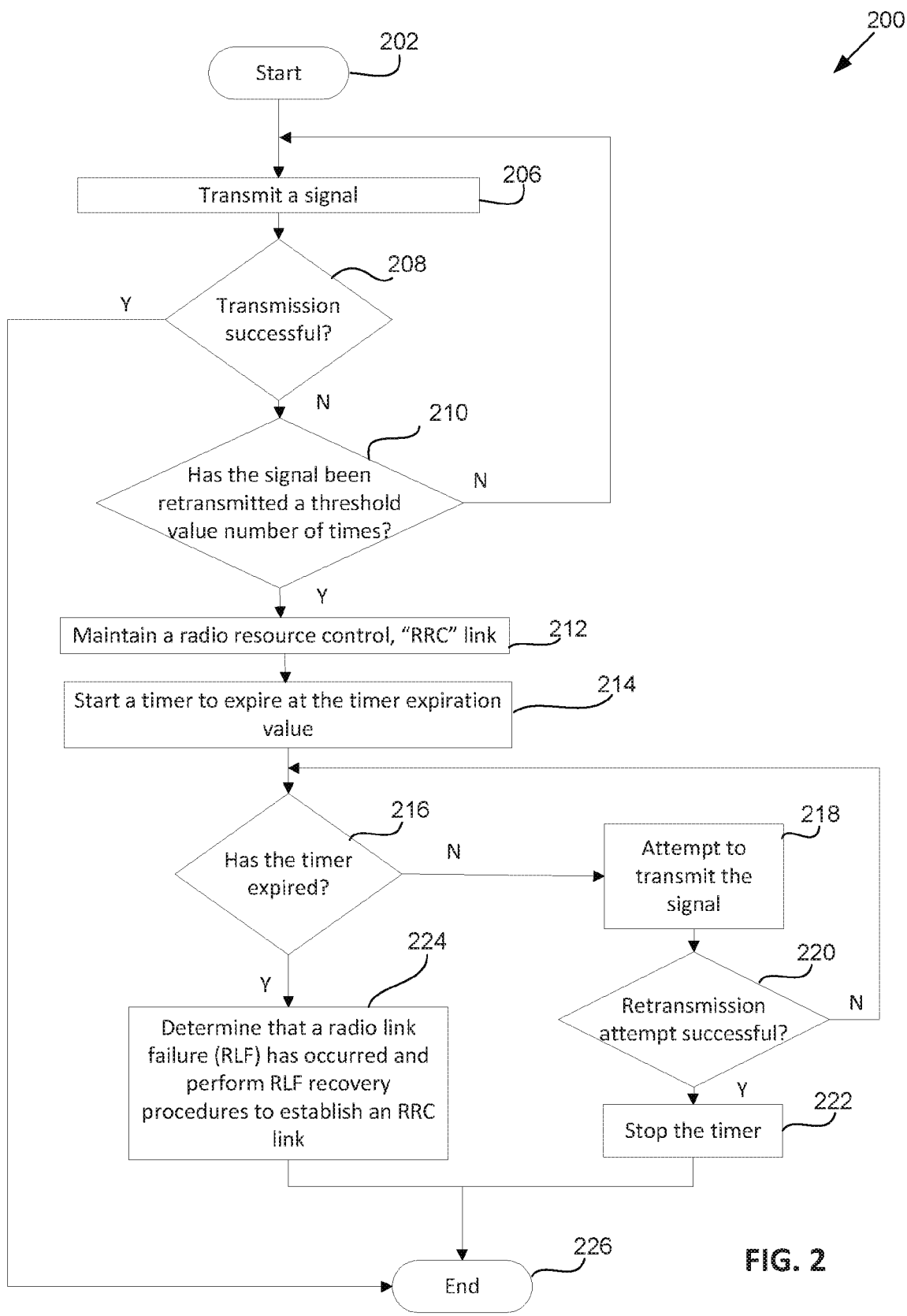
FIG. 2 is a block diagram illustrating a method for increasing data throughput in response to 5G channel blockage by using a retransmission timer, in accordance with various embodiments.

FIG. 2 is a block diagram illustrating a process for increasing data throughput in response to 5G channel blockage by using a retransmission timer, in accordance with various embodiments. The process 200 may be performed by a UE, for example, UE 122, in accordance with various embodiments. In some embodiments, the UE may include one or more non-transitory computer-readable media having instructions, stored thereon, that when executed cause the UE to perform the process 200.

In embodiments, while executing process 200, while waiting for a 4G/5G blockage to clear, the UE may switch to an LTE link. This may be accomplished by the UE receiving an LTE signal from an LTE eNB, or based on a specification that after some predefined time the UE should switch to an LTE link. If the blockage clears, the UE or the eNB may detect the 5G link recovery and send a signal to the other device that transmission should resume on the 5G link. In embodiments, the signal may be a 5G signal to be sent to an eNodeB, for example, eNodeB 102. In embodiments, the signal may be an uplink signal, where the UE may have uplink data or need to retransmit an RLC status report.

At block 202, the process may start.

At block 206, a signal may be transmitted.

At block 208, a determination may be made over whether the transmission was successful. If the transmission was successful, then at block 226 the process may end.

Otherwise, if the transmission was not successful, then at block 210 a determination may be made over whether the signal has been retransmitted a threshold value number of times. If the signal has not been retransmitted a threshold value number of times, then the process may proceed to block 206 to retransmit the signal. In embodiments, the retransmission threshold value may be a value that identifies the maximum number of retransmission attempts before a delay may be imposed, for example, through the setting of a timer, after which a retransmission may be re-attempted.

Otherwise, if the signal has been retransmitted the threshold value number of times, then at block 212, the RRC may be maintained. This is different than in legacy implementations where, at this point, an RLF may be generated and the RRC link broken.

At block 214, a timer may be started to expire at a timer expiration value. In embodiments, the timer expiration value may be adjusted by the device, or by other devices to which the device may have been in communication. In embodiments, the timer expiration value may be adjusted according to the frequency and the nature of the 5G blockages. In embodiments, the timer may be referred to as an RLF_retx_timer. In embodiments, the timer value may be configured by the eNodeB or fixed in a specification, for example, the 3GPP specification for 5G. In embodiments, upon timer expiration, the UE may declare RLF and may perform RLF recovery procedures following the legacy specification. In embodiments, the UE may stop the timer when the blockage is over and the 5G link is back up to normal.

At block 216, a determination may be made whether the timer has expired. If the timer has expired, then at block 224 an RLF may be determined to have occurred and RLF recovery procedures may be performed to establish an RRC link. The process may then end at block 226.

Otherwise, if the timer has not expired, then at block 218 an attempt to retransmit the signal may be made. In embodiments, the device may continue to check, over the open RRC link, whether the blockage may have cleared.

At block 220, a determination may be made over whether the retransmission attempt was successful. If the retransmission attempt was not successful, then the process may proceed to block 216 to determine whether the timer has expired.

If the retransmission attempt was successful, then at block 222 the timer may be stopped. The process may end at block 226.

Figure 3:
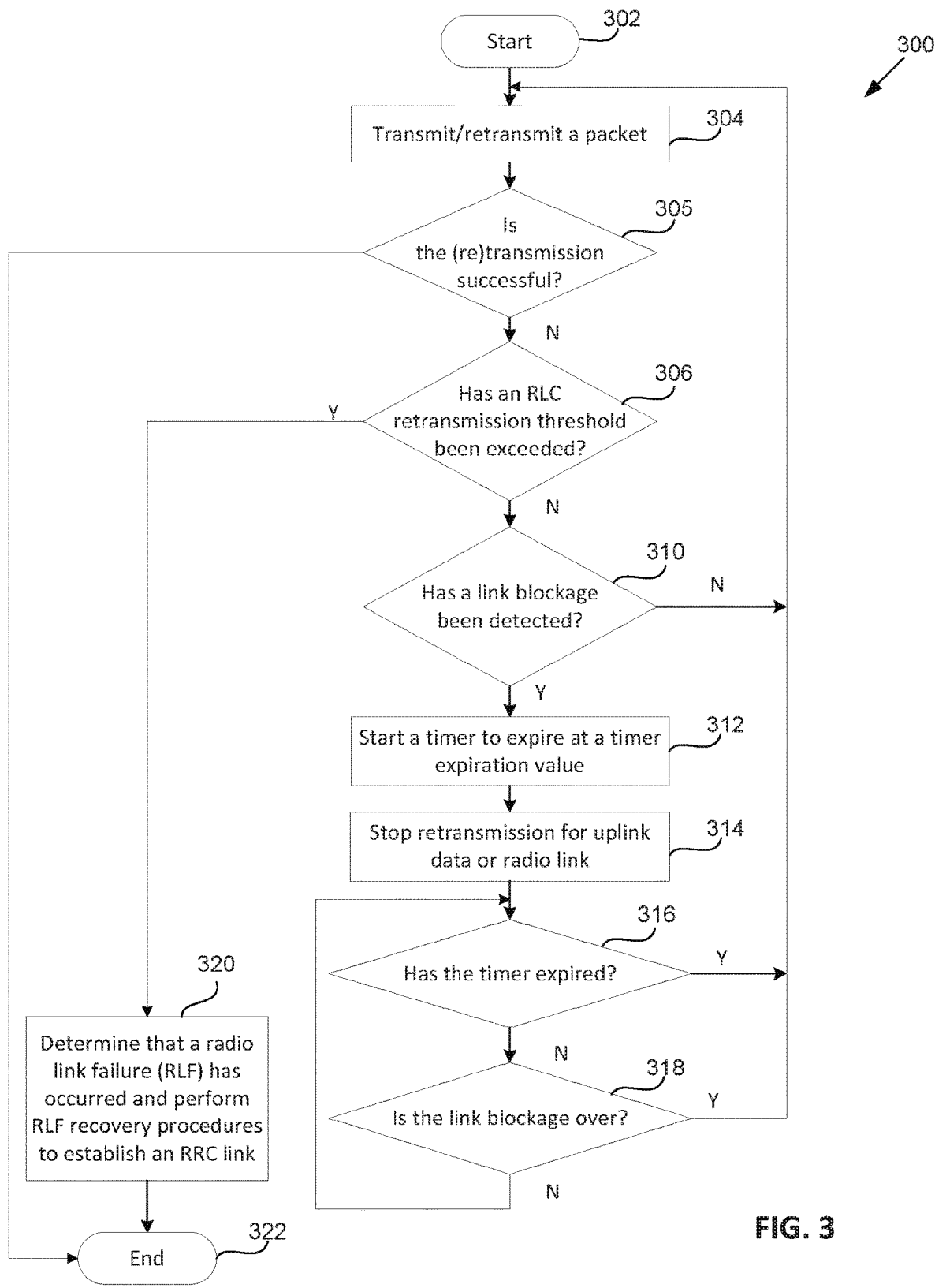
FIG. 3 is a block diagram illustrating a method for increasing data throughput in response to 5G channel blockage by using a per-packet timer, in accordance with various embodiments.

FIG. 3 is a block diagram illustrating a method for increasing data throughput in response to 5G channel blockage by using a per-packet timer, in accordance with various embodiments. The process 300 may be performed by a device such as a UE, for example, UE 122, in accordance with various embodiments. In some embodiments, the UE may include one or more non-transitory computer-readable media having instructions, stored thereon, that when executed cause the UE to perform the process 300.

In embodiments, the process 300 may introduce a new per-packet timer at the beginning of the packet transmission via 4G/5G link. Since the retransmissions will also fail if the channel is blocked, in this embodiment, the UE may delay the retransmission instead so there is no waste of resources. The UE stops retransmission for any uplink data or RLC status report when it detects link blockage. The UE will then start RLC_retx_waiting_timer for that packet. Upon the timer expiring or upon the detection mechanism determining that the link blockage is over, the UE resumes the retransmission. However, when the RLC retransmission exceeds the maximum number of retransmission threshold, the UE declares RLF.

At block 302, the process may start.

At block 304, the device may transmit or retransmit a packet. In embodiments, a (re)transmission may occur over a 5G network link.

At block 305, a determination may be made whether the (re)transmission was successful. If so, the process may end at block 322.

If the (re)transmission was not successful, at block 306, a determination may be made whether an RLC retransmission threshold has been exceeded. If so, then at block 320 the device may determine that an RLF has occurred and perform RLF recovery procedures to establish an RRC link. In embodiments, RLF recovery procedures may involve applying a random access process to reestablish a connection. In embodiments, the retransmission threshold value may be a value that identifies the maximum number of retransmission attempts before a delay may be imposed, for example, through the setting of a timer.

Otherwise, if the RLC retransmission threshold has not been exceeded, then at block 310, a determination of whether a link blockage has been detected may be made. If there has been no link blockage detected, then the process may proceed to step 304 and a packet may be retransmitted.

At block 312, a timer may be started that expires at a timer expiration value. In embodiments, the timer may be referred to as the RLC_retx_waiting_timer for the packet.

At block 314, retransmission for uplink data or the radio link may be stopped.

At block 316, a determination may be made whether the timer has expired. If the timer has expired, then the process may proceed to block 304 where a packet may be retransmitted.

Otherwise, if the timer has not expired, then at block 318 a determination may be made over whether the link blockage is over. If the link blockage is over, then the process may proceed to step 304 where a packet may be retransmitted.

Otherwise, if the link blockage is not over, then the process may proceed to block 316 for determination of whether the timer has expired.

Figure 4:
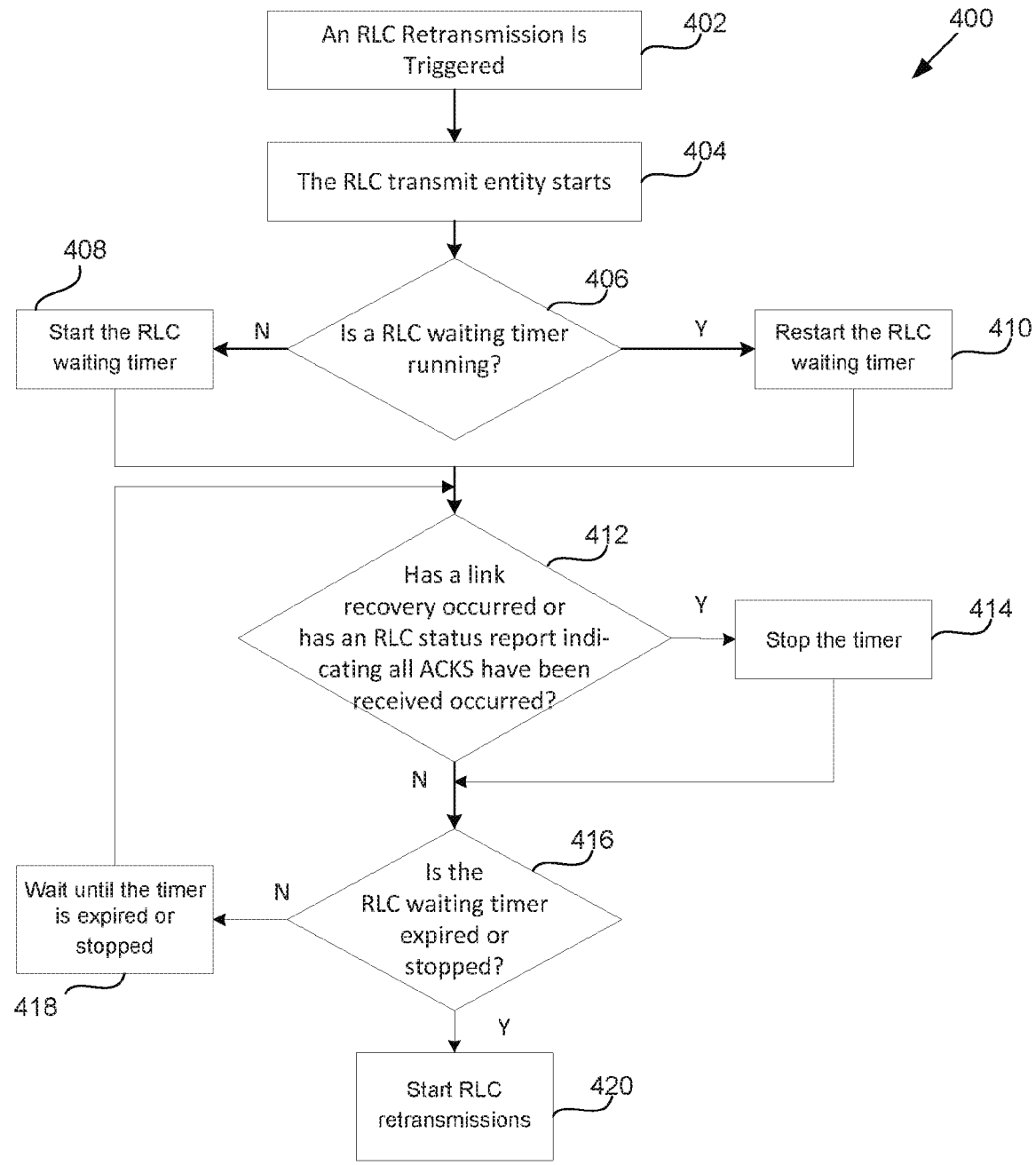
FIG. 4 is a block diagram illustrating a method for increasing data throughput in response to 5G channel blockage by using a timer per radio link control (RLC) entity, in accordance with various embodiments.

FIG. 4 is a block diagram illustrating a method for increasing data throughput in response to 5G channel blockage by using a timer per RLC entity, in accordance with various embodiments. The process 400 may be performed by a device such as a UE, for example, UE 122, in accordance with various embodiments. In some embodiments, the UE may include one or more non-transitory computer-readable media having instructions, stored thereon, that when executed cause the UE to perform the process 400. In embodiments, process 400 may be similar to process 300 where a new timer may be introduced; however, in process 400 the timer may be per RLC entity instead of per packet.

At block 402, an RLC retransmission may be triggered. In embodiments, the RLC retransmission may be triggered by an RLC status report or based on a negative acknowledgement ("NACK") in an RLC status report.

At block 404, the RLC transmission may start. In embodiments, the RLC transmission may start if it is not already running, or may restart if it is already running.

At block 406, determination may be made over whether the RLC waiting timer is running. If it is running, then at block 410 a RLC waiting timer may be restarted. If it is not running, then at block 408 the RLC waiting timer may be started.

At block 412, a determination over whether a link recovery has occurred, or if an RLC status report indicating all ACKs have been received (for example, no retransmission may be needed) has occurred. If one of these has occurred, then at block 414 the timer may be stopped.

At block 416, a determination of whether the RLC waiting timer is expired or stopped may be made. If the waiting timer is expired or stopped, then at block 420 RLC retransmissions may be started. In embodiments, only after the timer is expired or stopped may a retransmission start.

Otherwise, if it is not the case that the RLC waiting timer is expired or stopped, then at block 418 the process may wait until the timer is expired or stopped. The process may then go to block 412 to determine whether a link recovery has occurred or an RLC status report indicating all ACKs have been received has occurred.

Figure 5:
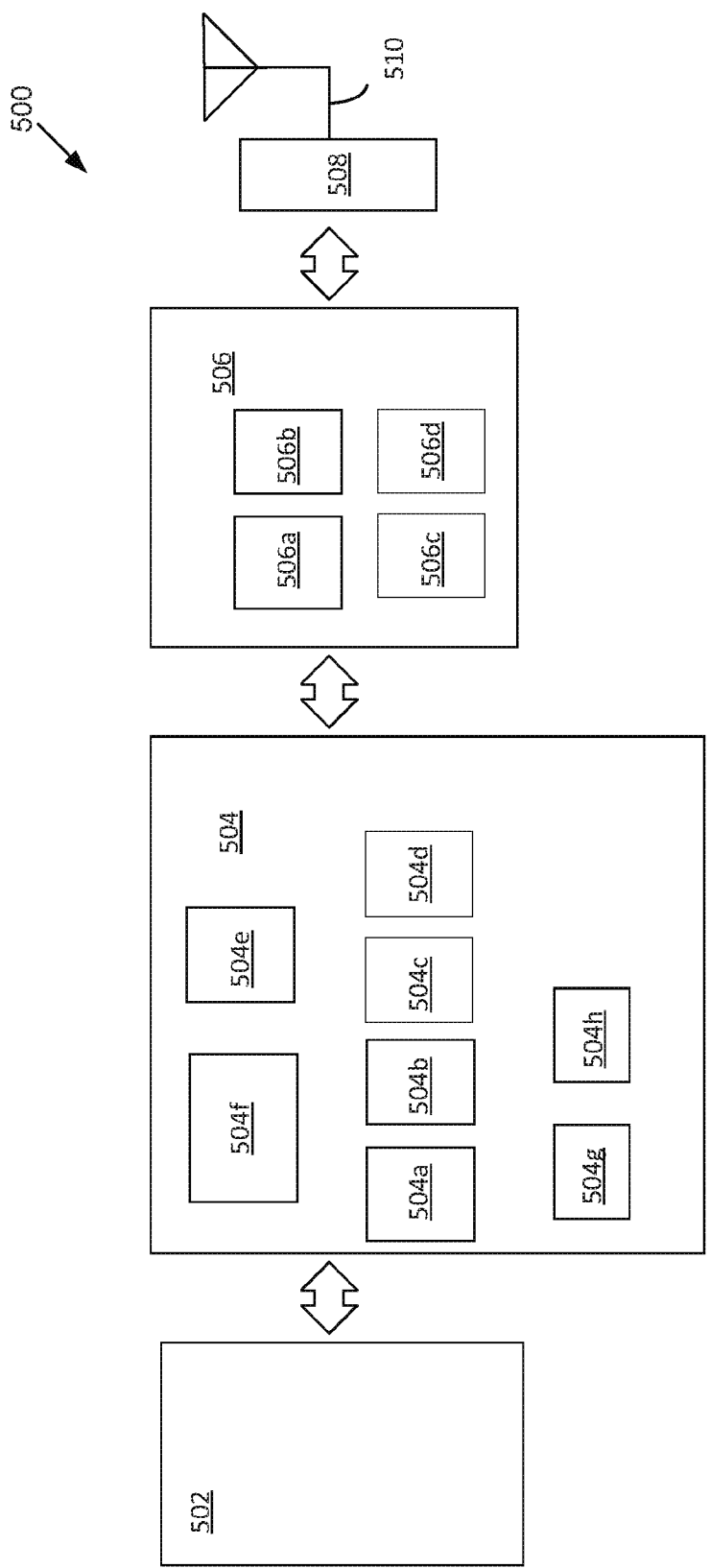
FIG. 5 is a block diagram illustrating a computing device adapted to operate in alternative responses to 5G channel blockages, in accordance with various embodiments.

FIG. 5 illustrates an implementation of an embodiment of a system using any suitably configured circuitry and/or software. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 5 illustrates, for one embodiment, example components of a user equipment (UE) device 500. In some embodiments, the UE device 500 may include application circuitry 502, baseband circuitry 504, radio frequency (RF) circuitry 506, front-end module (FEM) circuitry 508 and one or more antennas 510, coupled together at least as shown.

The application circuitry 502 may include one or more application processors.

For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 504 may include circuitry such as, but not limited to, one or more single-core or multi-core processors. The baseband circuitry 504 may include one or more baseband processors and/or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a second generation (2G) baseband processor 504a, third generation (3G) baseband processor 504b, fourth generation (4G) baseband processor 504c, and/or other baseband processor(s) 504d for other existing generations, generations in development or to be developed in the future (e.g., fifth generation (5G), 6G, etc.). The baseband circuitry 504 (e.g., one or more of baseband processors 504a-d) may handle various radio control functions that enable communication with one or more radio networks via the RF circuitry 506. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, and/or constellation mapping/demapping functionality. In some embodiments, encoding/decoding circuitry of the baseband circuitry 504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Control circuitry 504e of the baseband circuitry 504, which may be one or more processing units such as a CPU, may be configured to run elements of the protocol stack for signaling of the PHY, MAC, RLC, PDCP and/or RRC layers. In some embodiments, the control circuitry 504e may be coupled with memory circuitry 504g and timer circuitry 504h to perform operations described herein in accordance with various embodiments. For example, the memory circuitry 504g may be used to include and/or store a retransmission threshold value and the timer circuitry 504h may be set with the timer expiration value. The control circuitry 504e may use the retransmission value and the timer expiration value to detect 4G/5G blockage and may remove an RLF condition in a manner similar to that described herein with respect to other embodiments including, but not limited to, embodiments described with respect to FIGS. 1-4.

In some embodiments, the baseband circuitry may include one or more audio digital signal processor(s) (DSP) 504f. The audio DSP(s) 504f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path that may include circuitry to down-convert RF signals received from the FEM circuitry 508 and provide baseband signals to the baseband circuitry 504. RF circuitry 506 may also include a transmit signal path that may include circuitry to up-convert baseband signals provided by the baseband circuitry 504 and provide RF output signals to the FEM circuitry 508 for transmission.

In some embodiments, the RF circuitry 506 may include a receive signal path and a transmit signal path. The receive signal path of the RF circuitry 506 may include mixer circuitry 506a, amplifier circuitry 506b and filter circuitry 506c. The transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c. The filter circuitry 506c may include a low-pass filter (LPF), although the scope of the embodiments is not limited in this respect.

In some embodiments, the mixer circuitry 506a of the receive signal path and the mixer circuitry 506a of the transmit signal path may include two or more mixers and may be arranged for quadrature downconversion and/or upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a of the transmit signal path may be arranged for direct downconversion and/or direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable.

For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path that may include circuitry configured to operate on RF signals received from one or more antennas 510, amplify the received signals and provide the amplified versions of the received signals to the RF circuitry 506 for further processing. FEM circuitry 508 may also include a transmit signal path that may include circuitry configured to amplify signals for transmission provided by the RF circuitry 506 for transmission by one or more of the one or more antennas 510.

In some embodiments, the FEM circuitry 508 may include a TX/RX switch to switch between transmit mode and receive mode operation. The FEM circuitry 508 may include a receive signal path and a transmit signal path. The receive signal path of the FEM circuitry 508 may include a low-noise amplifier (LNA) to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the device 500 may include additional elements such as, for example, memory/storage, display, camera, sensor, and/or input/output (I/O) interface. In embodiments, the electronic device 500 is, implements, is incorporated into, or is otherwise part of a legacy LTE eNodeB and/or a 4G/5G eNodeB, which devices may be incorporated into one device or may be two separate devices. In embodiments, the electronic device 500 is, implements, is incorporated into, or is otherwise part of a legacy LTE UE and/or a 4G/5G UE, which devices may be incorporated into one device or may be two separate devices.

In embodiments where the electronic device 500 is, implements, is incorporated into, or is otherwise part of a UE, baseband circuitry 504 may detect a 4G/5G link blockage and remove a radio link failure condition in a manner similar to that described herein with respect to other embodiments including, but not limited to, embodiments described with respect to FIGS. 1-4.

In embodiments where the electronic device 500 is, implements, is incorporated into, or is otherwise part of a UE, baseband circuitry 504 may cause the RF circuitry 506 to transmit uplink data or an RLC status report via a 4G/5G link; detect a blockage of the 4G/5G link, which detection may be with respect to a packet; start a timer for the packet or link ("RLC_retx_waiting_timer"); determine if a detection mechanism indicates the 4G/5G link blockage is over or if the RLC_retx_waiting_timer expires; and declare RLF if an RLC retransmission exceeds a maximum retransmission threshold.

In embodiments where the electronic device 500 is, implements, is incorporated into, or is otherwise part of an evolved NodeB ("eNodeB"), baseband circuitry 504 may detect a link blockage in a 4G/5G link based on a missing RLC status report and/or based on a polling on the status report.

In embodiments where the electronic device 500 is, implements, is incorporated into, or is otherwise part of an LTE evolved NodeB ("eNodeB"), baseband circuitry 504 may receive a blockage indicator and may forward the blockage indicator to a 4G/5G eNodeB.

In embodiments where the electronic device 500 is, implements, is incorporated into, or is otherwise part of an evolved NodeB ("eNodeB"), baseband circuitry 504 may determine or cause to determine that a 4G/5G link RLC retransmission has reached a maximum retransmission threshold and may stop or cause to stop a transmission in the 4G/5G link; receive or cause to receive a UE blockage indication; and stop or cause to stop retransmission early until receipt of a UE status report for retransmission.

In embodiments where the electronic device 500 is, implements, is incorporated into, or is otherwise part of an evolved NodeB ("eNodeB") and/or a UE, baseband circuitry 504 may communicate with an RLC transmission; determine or cause to determine that RLC retransmission is triggered; start (if not already running) or restart (if already running) or cause to start or restart a timer; and cause the RF circuitry 506 not to transmit in a 4G/5G link; detect or cause to detect via a detection mechanism that a blockage of a 4G/5G link is over; stop the timer; and, if the timer is stopped or has expired, retransmit in the 4G/5G link.

Figure 6:
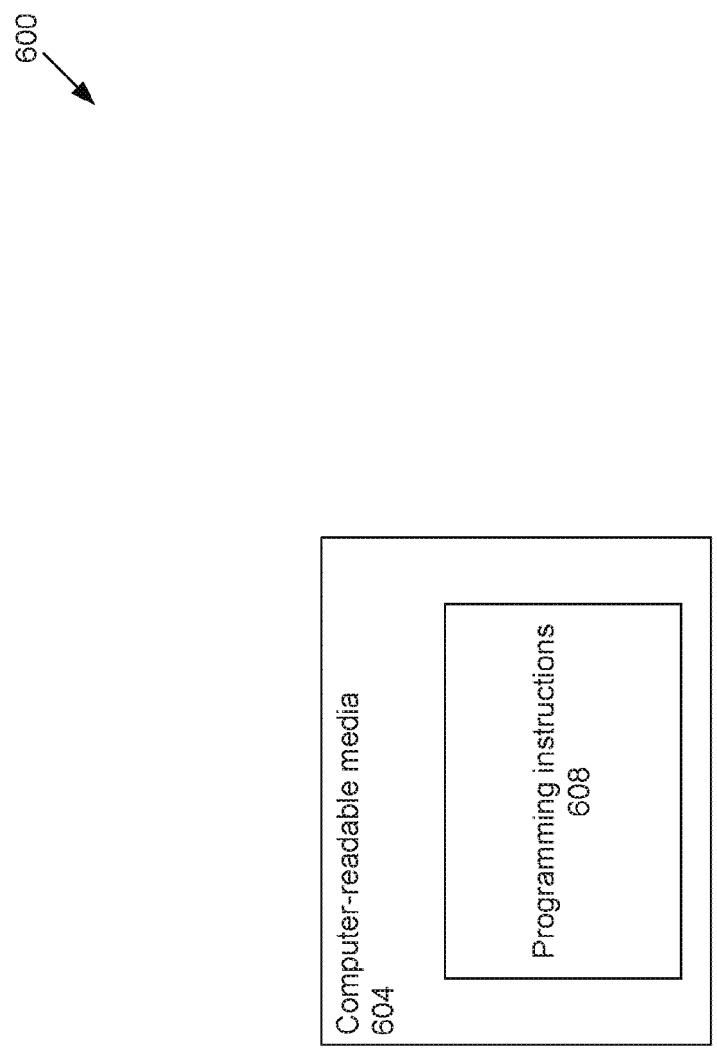
FIG. 6 illustrates an example computer-readable media that may be suitable for use to store instructions that cause an apparatus, in response to execution of the instructions by the apparatus, to practice selected aspects of the present disclosure.

FIG. 6 illustrates an example computer-readable media 604 that may be suitable for use to store instructions that cause an apparatus, in response to execution of the instructions by the apparatus, to practice selected aspects of the present disclosure. In some embodiments, the computer-readable media 604 may be non-transitory. As shown, computer-readable storage medium 604 may include programming instructions 608. Programming instructions 608 may be configured to enable a device, for example, a network functions virtualization orchestrator (NFVO), a virtual network function manager (VNFM), a global monitor, a host device, an operational support system (OSS)/business support system (BSS), a network manager (NM), an exchange manager (EM), or similar computing devices, in response to execution of the programming instructions 608, to implement (aspects of) any of the methods or elements described throughout this disclosure related to virtual machine (VM) monitoring and management. In some embodiments, the programming instructions 608 may be configured to enable a device, in response to execution of the programming instructions 608, to implement (aspects of) any of the methods or elements described throughout this disclosure related to lifecycle management operations performed by physical network functions (PNFs), virtual network functions (VNFs), virtual network function containers (VNFCs), and VMs and performing actions to instantiate new VM/VNFCs (virtualization deployment unit (VDUs)), shut down existing VM/VNFCs (VDUs), or scale VM/VNFCs (VDUs) up or down. In some embodiments, programming instructions 608 may be disposed on computer-readable media 604 that is transitory in nature, such as signals.

Any combination of one or more computer-usable or computer-readable media may be utilized. The computer-usable or computer-readable media may be, for example, but not limited to, an electronic, magnetic, optical, electromagnetic, infrared, or semiconductor system, apparatus, device, or propagation medium. More specific examples (a non-exhaustive list) of the computer-readable media would include the following: an electrical connection having one or more wires, a portable computer diskette, a hard disk, RAM, ROM, an erasable programmable read-only memory (for example, EPROM, EEPROM, or Flash memory), an optical fiber, a portable compact disc read-only memory (CD-ROM), an optical storage device, a transmission media such as those supporting the Internet or an intranet, or a magnetic storage device. Note that the computer-usable or computer-readable media could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable media may be any medium that can contain, store, communicate, propagate, or transport the program for use by or in connection with the instruction execution system, apparatus, or device. The computer-usable media may include a propagated data signal with the computer-usable program code embodied therewith, either in baseband or as part of a carrier wave. The computer-usable program code may be transmitted using any appropriate medium, including but not limited to wireless, wireline, optical fiber cable, radio frequency, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations or block diagrams of methods, apparatus (systems) and computer program products according to embodiments of the disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flowchart or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart or block diagram block or blocks.

EXAMPLES

Example 1 may be an apparatus for a user equipment, "UE", the apparatus comprising baseband circuitry including: memory circuitry to include a retransmission threshold value; timer circuitry to be set with a timer expiration value; and control circuitry, coupled with the memory circuitry and the timer circuitry, the control circuitry to manage a link blockage, wherein the control circuitry is to: upon retransmission of a signal a retransmission threshold value number of times: maintain a radio resource control, "RRC", link; start the timer circuitry to expire at the timer expiration value; while the timer circuitry has not expired, attempt retransmission of the signal; if one of the attempted retransmissions of the signal is successful, then stop the timer circuitry; and if no attempted retransmissions of the signal are successful and the timer circuitry has expired, then: determine that a radio link failure, "RLF", has occurred; and perform RLF recovery procedures to establish an RRC connection.

Example 2 may include the subject matter of Example 1, wherein the timer expiration value is configured by an evolved NodeB, "eNodeB", or fixed in a specification.

Example 3 may include the subject matter of any Examples 1-2, wherein the signal is to be transmitted on a 5G network.

Example 4 may include the subject matter of Example 3, wherein upon retransmission of the signal the retransmission threshold value number of times, the control circuitry is further to begin transmission of the signal on a long term evolution, "LTE", network.

Example 5 may include the subject matter of any Examples 1-2, wherein the signal is a portion of a data file to be transferred from the UE.

Example 6 may include the subject matter of any Examples 1-2, wherein the signal is a packet.

Example 7 may include the subject matter of any Examples 1-2, wherein the retransmission threshold value number is configured by an eNodeB or fixed in a specification.

Example 8 may be an apparatus for a user equipment, "UE", the apparatus comprising baseband circuitry including: memory circuitry to include a retransmission threshold value; timer circuitry to be set with a timer expiration value; and control circuitry, coupled with the memory circuitry and the timer circuitry, the control circuitry to manage a link blockage, wherein the control circuitry is to: upon detection of a link blockage after transmission of a signal: start the timer circuitry to expire at the timer expiration value; while the timer circuitry has not expired: stop retransmission of the signal; and if the timer circuitry is expired or if the link blockage is over, retransmit the signal; and if a number of retransmissions has exceeded a retransmission threshold, then: determine that a radio link failure, "RLF", has occurred; and perform RLF recovery procedures to establish an RRC link.

Example 9 may include the subject matter of Example 8, wherein the signal is a packet.

Example 10 may include the subject matter of any Examples 8-9, wherein the timer expiration value is configured by an evolved nodeB, "eNodeB", or fixed in a specification.

Example 11 may include the subject matter of Example 10, wherein the signal is to be transmitted on a 5G network.

Example 12 may include the subject matter of Example 11, wherein upon detection of a link blockage after transmission of a signal, the control circuitry is further to begin transmission of the signal on a long term evolution, "LTE", network.

Example 13 may include the subject matter of any Examples 8-9, wherein the signal is a portion of a data file to be transferred from the UE.

Example 14 may include the subject matter of any Examples 8-9, wherein the retransmission threshold value number is configured by an eNodeB or fixed in a specification.

Example 15 may be an apparatus for a user equipment, "UE", the apparatus comprising baseband circuitry including: means for: starting or restarting a timer to expire at a timer expiration value if a radio link control, "RLC", retransmission is detected; and stopping the timer if a link recovery has occurred or an RLC status report indicating that all acknowledgments, "ACKs", have been received has occurred; and means for starting RLC retransmissions if the timer is stopped or expired.

Example 16 may include the subject matter of Example 15, wherein an RLC transmission trigger is based on a negative acknowledgement, "NACK", in an RLC status report.

Example 17 may include the subject matter of any Examples 15-16, wherein the timer expiration value is configured by an evolved nodeB, "eNodeB", or fixed in a specification.

Example 18 may include the subject matter of any Examples 15-16, wherein the transmission is on a long term evolution, "LTE", network.

Example 19 may include the subject matter of any Examples 15-16, wherein the transmission is on a 5G network.

Example 20 may include the subject matter of any Examples 15-16, wherein if the timer circuitry is stopped or expired, start RLC retransmissions on a long term evolution, "LTE", network.

Example 21 may be one or more computer-readable media comprising instructions that cause a computing device, in response to execution of the instructions by the computing device, to: upon retransmission of a signal a retransmission threshold value number of times: maintain a radio resource control, "RRC", link; start a timer to expire at a timer expiration value; while the timer circuitry has not expired: attempt retransmission of the signal; and if one of the attempted retransmissions of the signal is successful, then stop the timer; and if no attempted retransmissions of the signal are successful and the timer has expired, then: determine a radio link failure, "RLF", has occurred; and perform RLF recovery procedures to establish a radio resource control, "RRC", connection.

Example 22 may include the subject matter of Example 21, wherein the timer expiration value is configured by an evolved nodeB, "eNodeB", or fixed in a specification.

Example 23 may include the subject matter of any Examples 21-22, wherein the signal is to be transmitted on a 5G network.

Example 24 may include the subject matter of any Examples 21-22, wherein the signal is to be transmitted on a 5G network.

Example 25 may include the subject matter of any Examples 21-22, wherein upon retransmission of the signal the retransmission threshold value number of times, the computing device is further to begin transmission of the signal on a long term evolution, "LTE", network.

Example 26 may include the subject matter of any Examples 21-22, wherein the signal is a portion of a data file to be transferred from the UE.

Example 27 may include the subject matter of any Examples 21-22, wherein the signal is a packet.

Example 28 may include the subject matter of any Examples 21-22, wherein the retransmission threshold value number is configured by an eNodeB or fixed in a specification.

Example 29 may be one or more computer-readable media comprising instructions that cause a computing device, in response to execution of the instructions by the computing device, to: upon detection of a link blockage after transmission of a signal: start a timer to expire at a timer expiration value; while the timer circuitry has not expired: stop retransmission of the signal; and if the timer circuitry is expired or if the link blockage is over, retransmit the signal; and if a number of retransmissions has exceeded the retransmission threshold, then: determine a radio link failure, "RLF", has occurred; and perform RLF recovery procedures to establish a radio resource control "RRC", link.

Example 30 may include the subject matter of Example 29, wherein the signal is a packet.

Example 31 may include the subject matter of Example 29, wherein the timer expiration value is configured by an evolved nodeB, "eNodeB", or fixed in a specification.

Example 32 may include the subject matter of any Examples 29-31, wherein the signal is to be transmitted on a 5G network.

Example 33 may include the subject matter of Example 32, wherein upon detection of a link blockage after transmission of a signal, the computing device is further to begin transmission of the signal on a long term evolution, "LTE", network.

Example 34 may include the subject matter of any Examples 29-31, wherein the signal is a portion of a data file to be transferred from the UE.

Example 35 may include the subject matter of any Examples 29-31, wherein the retransmission threshold value number is configured by an eNodeB or fixed in a specification.

Example 36 may be one or more computer-readable media comprising instructions that cause a computing device, in response to execution of the instructions by the computing device, to: start or restart a timer to expire at a timer expiration value if a radio link control, "RLC", retransmission is detected; and stop the timer if a link recovery has occurred or an RLC status report indicating that all acknowledgments, "ACKs", have been received has occurred; and start RLC retransmissions if the timer is stopped or expired.

Example 37 may include the subject matter of Example 36, wherein an RLC transmission trigger is based on a negative acknowledgement, "NACK", in an RLC status report.

Example 38 may include the subject matter of Example 36, wherein the timer expiration value is configured by an evolved nodeB, "eNodeB", or fixed in a specification.

Example 39 may include the subject matter of any Examples 36-38, wherein the transmission is on a 5G network.

Example 40 may include the subject matter of any Examples 36-38, wherein the transmission is on a long term evolution, "LTE", network.

Example 41 may include the subject matter of any Examples 36-38, wherein if the timer circuitry is stopped or expired, start RLC retransmissions on a long term evolution, "LTE", network.

Example 42 may be an apparatus for managing a link blockage, the apparatus comprising: upon retransmission of a signal a retransmission threshold value number of times: means for maintaining a radio resource control, "RRC", link; means for starting a timer to expire at a timer expiration value; while the timer circuitry has not expired: means for attempting retransmission of the signal; and if one of the attempted retransmissions of the signal is successful, then means for stopping the timer; and if no attempted retransmissions of the signal are successful and the timer has expired, then: means for determining that a radio link failure, "RLF" has occurred; and means for performing RLF recovery procedures to establish an RRC connection.

Example 43 may include the subject matter of Example 42, wherein the timer expiration value is configured by an evolved nodeB, "eNodeB", or fixed in a specification.

Example 44 may include the subject matter of Example 42, wherein the signal is to be transmitted on a 5G network.

Example 45 may include the subject matter of any Examples 42-44, wherein upon retransmission of the signal the retransmission threshold value number of times, the apparatus further comprises means for beginning transmission of the signal on a long term evolution, "LTE", network.

Example 46 may include the subject matter of any Examples 42-44, wherein the signal is to be transmitted on a 5G network.

Example 47 may include the subject matter of any Examples 42-44, wherein the signal is a portion of a data file to be transferred from the UE.

Example 48 may include the subject matter of any Examples 42-44, wherein the signal is a packet.

Example 49 may include the subject matter of any Examples 42-44, wherein the retransmission threshold value number is configured by an eNodeB or fixed in a specification.

Example 50 may be an apparatus for managing a link blockage, the apparatus comprising: upon detection of a link blockage after transmission of a signal: means for starting a timer to expire at a timer expiration value; while the timer circuitry has not expired: means for stopping retransmission of the signal; and if the timer circuitry is expired or if the link blockage is over, means for retransmitting the signal; and if a number of retransmissions has exceeded a retransmission threshold, then: means for determining that a radio link failure, "RLF", has occurred; and means for performing RLF recovery procedures to establish an RRC link.

Example 51 may include the subject matter of Example 50, wherein the signal is a packet.

Example 52 may include the subject matter of any Examples 50-51, wherein the timer expiration value is configured by an evolved nodeB, "eNodeB", or fixed in a specification.

Example 53 may include the subject matter of any Examples 50-51, wherein the signal is to be transmitted on a 5G network.

Example 54 may include the subject matter of Example 53, wherein upon detection of a link blockage after transmission of a signal, the computing device is further to begin transmission of the signal on a long term evolution, "LTE", network.

Example 55 may include the subject matter of any Examples 50-51, wherein the signal is a portion of a data file to be transferred from the UE.

Example 56 may include the subject matter of any Examples 50-51, wherein the retransmission threshold value number is configured by an eNodeB or fixed in a specification.

Example 57 may be an apparatus for managing a link blockage, the apparatus comprising: means for: starting or restarting a timer to expire at a timer expiration value if a radio link control, "RLC", retransmission is detected; and stopping the timer if a link recovery has occurred or an RLC status report indicating that all acknowledgements, "ACKs", have been received has occurred; and means for starting RLC retransmissions if the timer is stopped or expired.

Example 58 may include the subject matter of Example 57, wherein an RLC transmission trigger is based on a negative acknowledgement, "NACK", in an RLC status report.

Example 59 may include the subject matter of any Examples 57-58, wherein the timer expiration value is configured by an evolved NodeB, "eNodeB", or fixed in a specification.

Example 60 may include the subject matter of any Examples 57-58, wherein the transmission is on a 5G network.

Example 61 may include the subject matter of any Examples 57-58, wherein the transmission is on a long term evolution, "LTE", network.

Example 62 may include the subject matter of any Examples 57-58, wherein if the timer circuitry is stopped or expired, start RLC retransmissions on a long term evolution, "LTE", network.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the disclosure also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read-only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present disclosure are not described with reference to any particular programming language. It will be appreciated that a variety of programming languages can be used to implement the teachings of embodiments of the disclosure as described herein. In the foregoing Specification, embodiments of the disclosure have been described with reference to specific exemplary embodiments thereof. It will be evident that various modifications can be made thereto without departing from the broader spirit and scope of the disclosure as set forth in the following claims. The Specification and drawings are, accordingly, to be regarded in an illustrative sense rather than a restrictive sense.

What is claimed is:

1. A user equipment, "UE" apparatus, the UE apparatus comprising baseband circuitry including:
   memory circuitry to include a retransmission threshold value; timer circuitry to be set with a timer expiration value; and
   control circuitry, coupled with the memory circuitry and the timer circuitry, the control circuitry to manage a link blockage, wherein the control circuitry is to:
   upon retransmission of a signal a retransmission threshold value number of times:
   maintain a radio resource control, "RRC", link;
   start the timer circuitry to expire at the timer expiration value;
   while the timer circuitry has not expired, attempt retransmission of the signal;
   if one of the attempted retransmissions of the signal is successful, then stop the timer circuitry; and
   if no attempted retransmissions of the signal are successful and the timer has expired, then:
   determine that a radio link failure, "RLF", has occurred; and
   perform RLF recovery procedures to establish an RRC connection.

2. The UE apparatus of claim 1, wherein the timer expiration value is configured by an evolved NodeB, "eNodeB", or fixed in a specification.

3. The UE apparatus of claim 1, wherein the signal is to be transmitted on a 5G network.

4. The UE apparatus of claim 3, wherein upon retransmission of the signal the retransmission threshold value number of times, the control circuitry is further to begin transmission of the signal on a long term evolution, "LTE", network.

5. The UE apparatus of claim 1, wherein the signal is a portion of a data file to be transferred from the UE.

6. The UE apparatus of claim 1, wherein the signal is a packet.

7. The UE apparatus of claim 1, wherein the retransmission threshold value number is configured by an evolved NodeB, "eNodeB", or fixed in a specification.

8. One or more non-transitory computer-readable media comprising instructions that cause a computing device, in response to execution of the instructions by the computing device, to:
   upon detection of a link blockage after transmission of a signal:
   start a timer to expire at a timer expiration value;
   while the timer has not expired: stop retransmission of the signal; and
   if the timer is expired or if the link blockage is over, retransmit the signal; and
   if a number of retransmissions has exceeded a retransmission threshold, then:
   determine, by the computing device, a radio link failure, "RLF", has occurred; and
   perform, by the computing device, RLF recovery procedures to establish a radio resource control, "RRC", link.

9. The computer readable media of claim 8, wherein the signal is a packet.

10. The computer readable media of claim 8, wherein the timer expiration value is configured by an evolved nodeB, "eNodeB", or fixed in a specification.

11. The computer readable media of claim 8, wherein the signal is to be transmitted on a 5G network.

12. The computer readable media of claim 11, wherein upon detection of a link blockage after transmission of a signal, the computing device is further to begin transmission of the signal on a long term evolution, "LTE", network.

13. The computer readable media of claim 8, wherein the signal is a portion of a data file to be transferred from the UE.

14. The computer readable media of claim 8, wherein the retransmission threshold value number is configured by an evolved NodeB, "eNodeB", or fixed in a specification.

15. An apparatus for managing a link blockage, the apparatus comprising:
   means for: starting or restarting a timer to expire at a timer expiration value if a radio link control, "RLC", retransmission is detected, indicating the link blockage; and stopping the timer if a link recovery has occurred or an RLC status report indicating that all acknowledgments, "ACKs", have been received has occurred, indicating an end of the link blockage; and
   means for starting RLC retransmissions if the timer is stopped or expired.

16. The apparatus of claim 15, wherein an RLC transmission trigger is based on a negative acknowledgement, "NACK", in an RLC status report.

17. The apparatus of claim 15, wherein the timer expiration value is configured by an evolved Node8, "eNodeB", or fixed in a specification.

18. The apparatus of claim 15, wherein the transmission is on a 5G network.

19. The apparatus of claim 15, wherein the transmission is on a long term evolution, "LTE", network.

20. The apparatus of claim 15, wherein if the timer circuitry is stopped or expired, start RLC retransmissions on a long term evolution, "LTE", network.

* * * * *